BAKER & HOYT.
Wheel-Harrow.

No. 70,314.                                                        Patented Oct. 29, 1867

INVENTORS:
A. C. Baker
N. O. Hoyt

UNITED STATES PATENT OFFICE.

ADELBERT C. BAKER AND NEWTON O. HOYT, OF LA FAYETTE, N. Y.

IMPROVEMENT IN WHEELED HARROW.

Specification forming part of Letters Patent No. 70,314, dated October 29, 1867.

*To all whom it may concern:*

Be it known that we, ADELBERT C. BAKER and NEWTON O. HOYT, of La Fayette, Onondaga county, New York, have invented a new and Improved Wheeled Harrow; and we do hereby declare that the following is a full, clear, and exact description of the construction of the same, and the mode of operation thereof when complete and ready for use, reference being had to the annexed drawings, making a part of this specification, in which—

Figure 1:
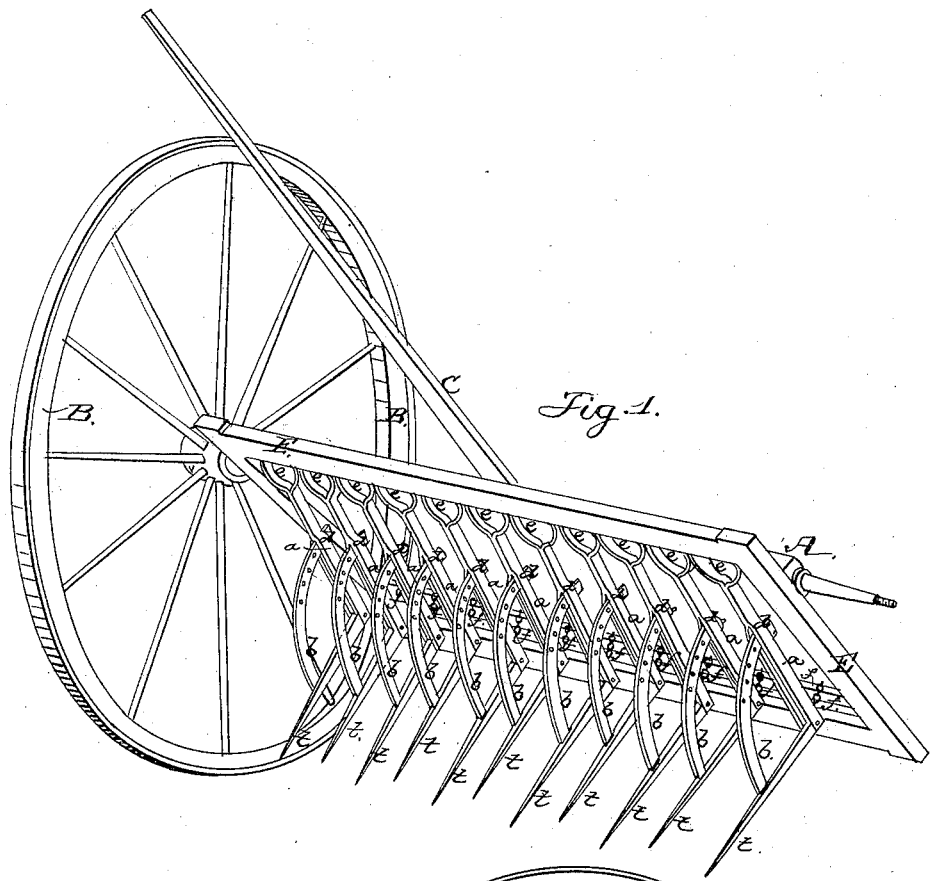
Figure 2:
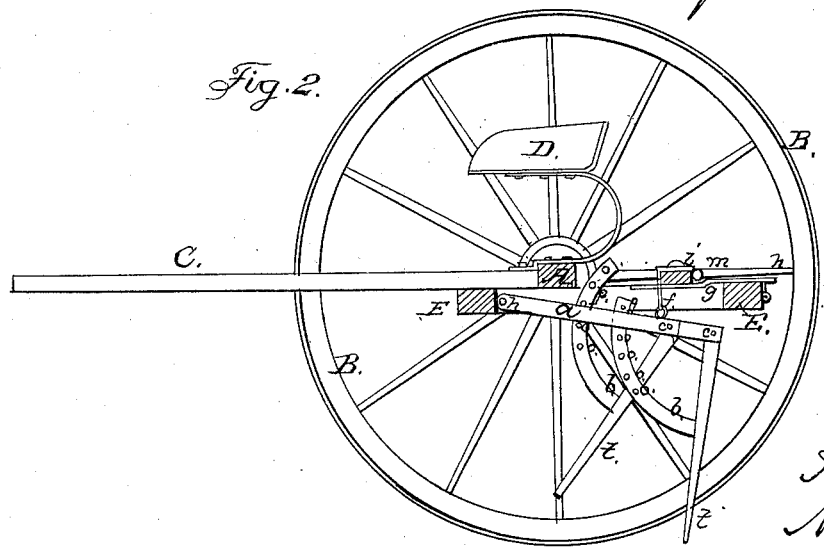

Figure 1 represents a perspective view thereof with one wheel left off. Fig. 2 represents a perpendicular cross-sectional view of the same nearly through the center.

To enable others skilled in the art to make and use our invention, we will proceed to describe the same, and its form and mode of operation when complete and ready for use.

The letters used represent corresponding parts wherever they occur.

A shows an axle in the ordinary form; B B, the wheels, made of a proper diameter for working the teeth, as hereinafter described; C, the tongue; D, the seat, so placed that the weight of the driver will balance upon the axle as near as may be.

We make the frame E of any wood which has the requisite strength, and of a size properly to fit between the wheels, the ordinary size of the frame being about four by eight feet, more or less, and extending back far enough to operate the teeth within the same, as hereinafter described, and attach the same firmly to the axle A and tongue C.

Each of the teeth $t\,t\,t$ is supported by an arm, $a\,a\,a$, and an adjusting-brace, $b\,b\,b$, of which the teeth should be iron, pointed with steel, and the arms and adjusting-braces may be made of common iron.

We consider it best to make the arm $a$ in two parts, (although it may be made in one,) which are the counterparts of each other, made so as to fit together and receive the upper end of the tooth between them in the form of a hinge and shoulder, as shown at $c$, and also receive the upper end of the adjusting-brace $b$ between them, as shown at $d$.

The parts at the other end of the arm are bent, so that when the two parts are put together in the form of an arm they will brace each way, as shown at $e$, and prevent too much side motion of the teeth.

The adjusting-brace $b$ has holes through it, $o\,o\,o$, for adjusting the teeth by means of the pin $p$. It is better to make the pin of wood, so that it will break easier than the other parts. The other end of the adjusting-brace is securely fastened to the tooth.

We make the arms $a\,a\,a$ of two different lengths, and alternate the same so as to make two rows of teeth in the harrow.

The arm is attached to the frame by means of a rod, $r$, running across the whole width of the frame in holes through the ends of the arms. This rod is securely fastened at each end, and stayed intermediately to prevent its springing. The arms may be also held to the frame by hooks in any common form.

The arms, teeth, and braces thus made are suspended from the revolving lever-bar F by means of the chains or other flexible supports $f\,f\,f$, attached to the arms in any ordinary manner, and passing over to the back part of the lever-bar, where the chain passes through a staple, $i$, and has a ring, $m$, on the end thereof, which serves the double purpose of holding the chain and affording an easy method of raising a single tooth by hand when that is desired.

To the lever-bar is attached the short lever-handle $g$, by means of which the lever-bar F may be turned and the teeth raised for convenience in carrying.

The end of the lever-handle may be held down by the hook $h$, made in any common form.

What we claim as our invention, and desire to secure by Letters Patent, is—

1. The arms $a\,a\,a$, the teeth $t\,t\,t$, and adjustable braces $b\,b\,b$, in combination with each other, substantially as and for the purposes described.

2. We also claim the same parts in combination with the frame E, lever-bar F, and chains $f\,f\,f$, made and operated substantially as and for the purposes described.

3. We also claim all the parts within and attached to the frame E, as above described, in combination with the axle A, wheels B B, tongue C, and seat D, substantially as and for the purposes described.

A. C. BAKER.
N. O. HOYT.

Witnesses:
W. R. CHAMBERLIN,
N. B. SMITH.